(12) United States Patent
Greiner et al.

(10) Patent No.: US 8,437,924 B2
(45) Date of Patent: May 7, 2013

(54) PERFORMANCE-BASED HAULAGE MANAGEMENT SYSTEM

(75) Inventors: Johny Greiner, Dunlap, IL (US); Yang Liu, Peoria, IL (US); Bhavin Vyas, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/316,894

(22) Filed: Dec. 12, 2011

(65) Prior Publication Data

US 2012/0083968 A1    Apr. 5, 2012

Related U.S. Application Data

(62) Division of application No. 11/897,736, filed on Aug. 31, 2007, now Pat. No. 8,099,217.

(51) Int. Cl.
*G06F 19/00* (2011.01)
*E02F 5/02* (2006.01)

(52) U.S. Cl.
USPC ............................................. 701/50; 37/347

(58) Field of Classification Search .......... 701/50, 701/80–97, 110, 114, 470; 37/205–223, 37/233, 236, 240, 242, 244, 246–252, 264, 37/266, 271, 305; 56/10.1, 10.2 R, 10.3–10.4, 56/10.2 A–10.2 H, 10.2 J, 10.5–17.6; 235/376
See application file for complete search history.

(56) References Cited

U.S. PATENT DOCUMENTS

| 5,610,821 | A | 3/1997 | Gazis et al. | |
|---|---|---|---|---|
| 5,646,844 | A * | 7/1997 | Gudat et al. | 701/409 |
| 5,719,771 | A | 2/1998 | Buck et al. | |
| 5,817,936 | A | 10/1998 | Schricker | |
| 6,246,932 | B1 | 6/2001 | Kageyama et al. | |
| 6,487,478 | B1 * | 11/2002 | Azzaro et al. | 701/24 |
| 6,611,755 | B1 | 8/2003 | Coffee et al. | |
| 6,622,087 | B2 | 9/2003 | Anderson | |
| 6,650,995 | B2 | 11/2003 | Bullock | |
| 6,654,684 | B2 | 11/2003 | Shinada et al. | |
| 6,865,484 | B2 | 3/2005 | Miyasaka et al. | |
| 6,950,740 | B1 | 9/2005 | Cook | |
| 6,965,325 | B2 | 11/2005 | Finnern | |
| 7,113,127 | B1 | 9/2006 | Banet et al. | |
| 7,155,321 | B2 | 12/2006 | Bromley et al. | |
| 8,014,924 | B2 | 9/2011 | Greiner et al. | |

(Continued)

OTHER PUBLICATIONS

Griener et al., Co-pending U.S. Appl. No. 11/897,651, filed Aug. 31, 2007.

(Continued)

*Primary Examiner* — James Trammell
*Assistant Examiner* — Muhammad Shafi
(74) *Attorney, Agent, or Firm* — Finnegan, Henderson, Farabow, Garrett & Dunner LLP

(57) ABSTRACT

A method for managing haul routes in work environments comprises collecting performance data associated with a machine operating in a work environment. The method also includes determining a drive axle torque of the machine and estimating a total effective grade associated with the machine based on the drive axle torque. The estimated total effective grade is compared with a threshold level and, if the estimated total effective grade exceeds the threshold level, a design performance of the machine may be simulated based on the calculated total effective grade. Design performance data is compared with the collected performance data, and a payload limit of the machine is adjusted if the design performance is inconsistent with collected performance data.

8 Claims, 4 Drawing Sheets

U.S. PATENT DOCUMENTS

| | | |
|---|---|---|
| 2002/0010569 A1 | 1/2002 | Yamamoto |
| 2002/0049523 A1 | 4/2002 | Diaz et al. |
| 2004/0039520 A1 | 2/2004 | Khavakh et al. |
| 2004/0122580 A1* | 6/2004 | Sorrells .......................... 701/80 |
| 2005/0171692 A1 | 8/2005 | Hamblen et al. |
| 2006/0036363 A1 | 2/2006 | Crook |
| 2006/0161335 A1 | 7/2006 | Beinhaker |
| 2007/0016363 A1 | 1/2007 | Huang et al. |
| 2007/0273481 A1* | 11/2007 | Soleimani .................... 340/10.1 |
| 2008/0281494 A1* | 11/2008 | Bai ................................. 701/54 |
| 2009/0006734 A1* | 1/2009 | Kishi et al. ................... 711/111 |

OTHER PUBLICATIONS

Griener et al., Co-pending U.S. Appl. No. 11/974,371, filed Oct. 12, 2007.

Griener et al., Co-pending U.S. Appl. No. 12/002,040, filed Dec. 14, 2007.

* cited by examiner

PERFORMANCE-BASED HAULAGE MANAGEMENT SYSTEM

RELATED APPLICATION

This application is a divisional of U.S. application Ser. No. 11/897,736 filed August 31, now pending which is hereby fully incorporated by reference.

TECHNICAL FIELD

The present disclosure relates generally to fleet management in environments that employ heavy machinery and, more particularly, to systems and methods for monitoring the performance of machines operating in a machine environment and managing haulage requirements of each machine.

BACKGROUND

In many work environments, particularly those that employ a fleet of machines that cooperate to perform a common task, productivity and efficiency of one machine may have a significant impact on the productivity and efficiency of other machines. For example, many large fleets include a combination of old and new machines. The old machines may be slower, more susceptible to fatigue, and less productive than new machines. In certain situations, the limited performance capabilities of the older machines may limit the productivity of the newer machines and, ultimately, the productivity of the work environment.

In mining environments, for example, dump trucks or haulers may be used to transport material from an excavation site to a production or delivery site via a haul route. Because mine operators are typically compensated based on the weight of material that is excavated from the mine and delivered for production, the profitability of the mining environment may ultimately depend on the speed and efficiency with which material is transported from the excavation site to the delivery site. In order to maximize the profitability of the mining environment, it may be advantageous to monitor and regulate the operation of each machine using the haul route, so that slower, less capable machines do not negatively impact faster, more productive machines.

One system for monitoring and regulating the operation of one or more vehicles operating in a common environment is described in U.S. Pat. No. 6,246,932 ("the '932 patent") to Kageyama et al. The '932 patent describes a vehicle monitoring system for directing or controlling movements of a plurality of vehicles operating in a worksite to minimize the interference between, and avoid the collision of, one or more of the vehicles. The vehicle monitoring system of the '932 patent includes position measuring equipment for measuring a position of one or more vehicles within the worksite. The vehicle monitoring system may be configured to calculate the travel distance, bearing, and speed of the vehicles. Based on the monitored position and calculated travel distance, bearing, and speed of the vehicles, the vehicle monitoring system may provide speed and directional commands to vehicle operators. These commands may limit the potential for vehicle collisions and reduce congestion in the worksite. In some cases, if the command signals are not obeyed, the vehicle monitoring system may override the operator controls and cause the machine to take appropriate measures (e.g., pull over, decelerate, etc.) to avoid a potential collision.

Although conventional systems may increase worksite efficiency by regulating speed and bearing of traveling vehicles to reduce congestion, they may be insufficient in certain situations. For example, many conventional systems, such as the system described in the '932 patent, merely provide commands to vehicle operators to adjust operating speed and/or bearing after the vehicle is underway, so as to avoid interference with other vehicles during vehicle travel. These systems, however, may not identify performance flaws of underperforming vehicles and take measures to prevent these flaws from affecting operations of other vehicles.

Furthermore, conventional vehicle monitoring systems may not be equipped to regulate the loading characteristics of the vehicles based on performance characteristics of the vehicles. As a result, work environments that routinely load vehicles to their maximum capacity may unnecessarily overburden slow or underperforming vehicles, which may, in turn, limit or reduce the maximum speed that these vehicles can travel. In doing so, these overburdened vehicles may unnecessarily limit the speed of following vehicles, thereby potentially slowing operations within the work environment and reducing worksite productivity. Conventional systems that merely adjust the speed of one or more vehicles so as to avoid interference between the vehicles may not adequately address performance changes of each vehicle based on the payload levels corresponding thereto.

The presently disclosed performance-based haulage management system is directed toward overcoming one or more of the problems set forth above.

SUMMARY OF THE INVENTION

In accordance with one aspect, the present disclosure is directed toward a method for managing haul routes in work environments. The method may include collecting performance data associated with a machine during a haul route run in a work environment and monitoring a route completion time associated with the machine. The route completion time may be compared with a threshold completion time and, if the route completion time exceeds the threshold completion time, a first payload level for the machine may be selected. Using a model derived from the performance data of the machine, operation of the machine may be simulated based on the first payload level to generate a simulated route completion time of the machine. If the simulated route completion time does not exceed the threshold completion time, a payload limit of the machine may be established as the first payload level.

According to another aspect, the present disclosure is directed toward a method for managing haul routes in work environments. The method may include collecting performance data associated with a machine operating in a work environment. The method may also include determining a drive axle torque of the machine and calculating a total effective grade associated with the machine based on the drive axle torque. The estimated total effective grade may be compared with a threshold level and, if the estimated total effective grade exceeds the threshold level, a design performance of the machine may be simulated based on the calculated total effective grade. The design performance data may be compared with the collected performance data, whereby a payload limit of the machine may be adjusted if the design performance is inconsistent with collected performance data.

In accordance with yet another aspect, the present disclosure is directed toward a haul route management system. The haul route management system may include a condition monitoring system in data communication with a machine operating in a work environment and configured to collect performance data associated with the machine. The system may also include a torque estimator communicatively coupled to the condition monitoring system and configured to determine a drive axle torque of the machine and estimate a total effective grade associated with the machine based on the drive axle torque. The system may further include a performance simulator communicatively coupled to the torque estimator and the condition monitoring system. The performance simulator may be configured to compare the estimated total effective grade with a threshold level. If the estimated total effective grade exceeds the threshold level, a design performance of the machine may be simulated based on the estimated total effective grade. The design performance data may be compared with the collected performance data, and a payload analysis of the machine may be performed if the collected performance data is inconsistent with the design performance data. The method may also include establishing a payload limit of the machine based on the payload analysis.

DETAILED DESCRIPTION

Figure 1:
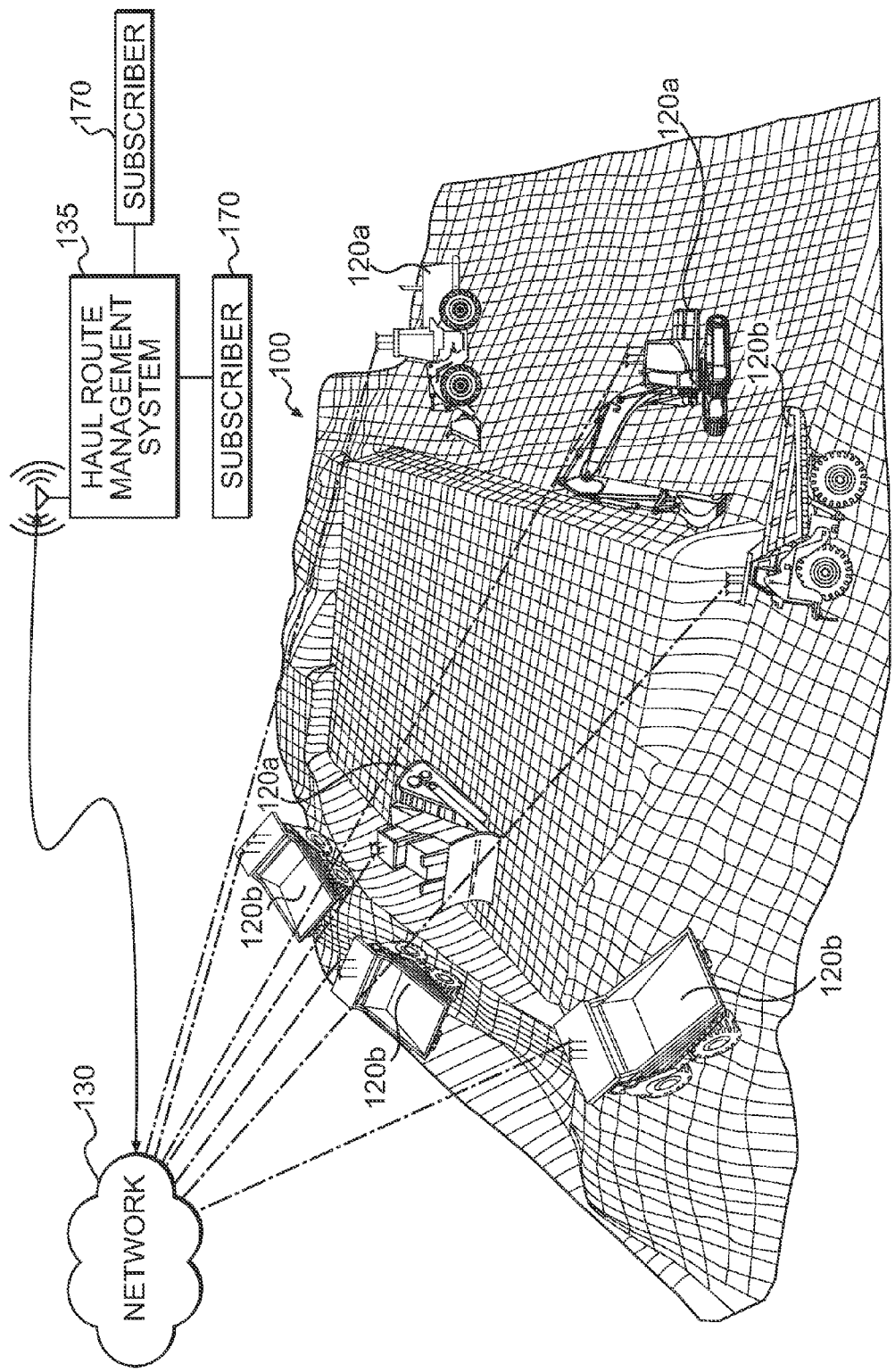
FIG. 1 illustrates an exemplary work environment consistent with the disclosed embodiments.

FIG. 1 illustrates an exemplary work environment 100 consistent with the disclosed embodiments. Work environment 100 may include systems and devices that cooperate to perform a commercial or industrial task, such as mining, construction, energy exploration and/or generation, manufacturing, transportation, agriculture, or any task associated with other types of industries. According to the exemplary embodiment illustrated in FIG. 1, work environment 100 may include a mining environment that comprises one or more machines 120a, 120b coupled to a haul route management system 135 via a communication network 130. Work environment 100 may be configured to monitor, collect, and filter information associated with the status, health, and performance of one or more machines 120a, 120b, and distribute the information to one or more back-end systems or entities, such as haul route management system 135 and/or subscribers 170. It is contemplated that additional and/or different components than those listed above may be included in work environment 100.

As illustrated in FIG. 1, machines 120a, 120b may include one or more excavators 120a and one or more transport machines 120b. Excavators 120a may embody any machine that is configured to remove material from the mine and load the material onto one or more transport machines 120b. Non-limiting examples of excavators 120a include, for example, bucket-type excavating machines, electromagnetic-lift devices, backhoe loaders, dozers, etc. Transport machines 120b may embody any machine that is configured to transport materials within work environment 100 such as, for example, articulated trucks, dump trucks, or any other truck adapted to transport materials. The number, sizes, and types of machines illustrated in FIG. 1 are exemplary only and not intended to be limiting. Accordingly, it is contemplated that work environment 100 may include additional, fewer, and/or different components than those listed above. For example, work environment 100 may include a skid-steer loader, a track-type tractor, material transfer vehicle, or any other suitable fixed or mobile machine that may contribute to the operation of work environment 100.

Figure 2:
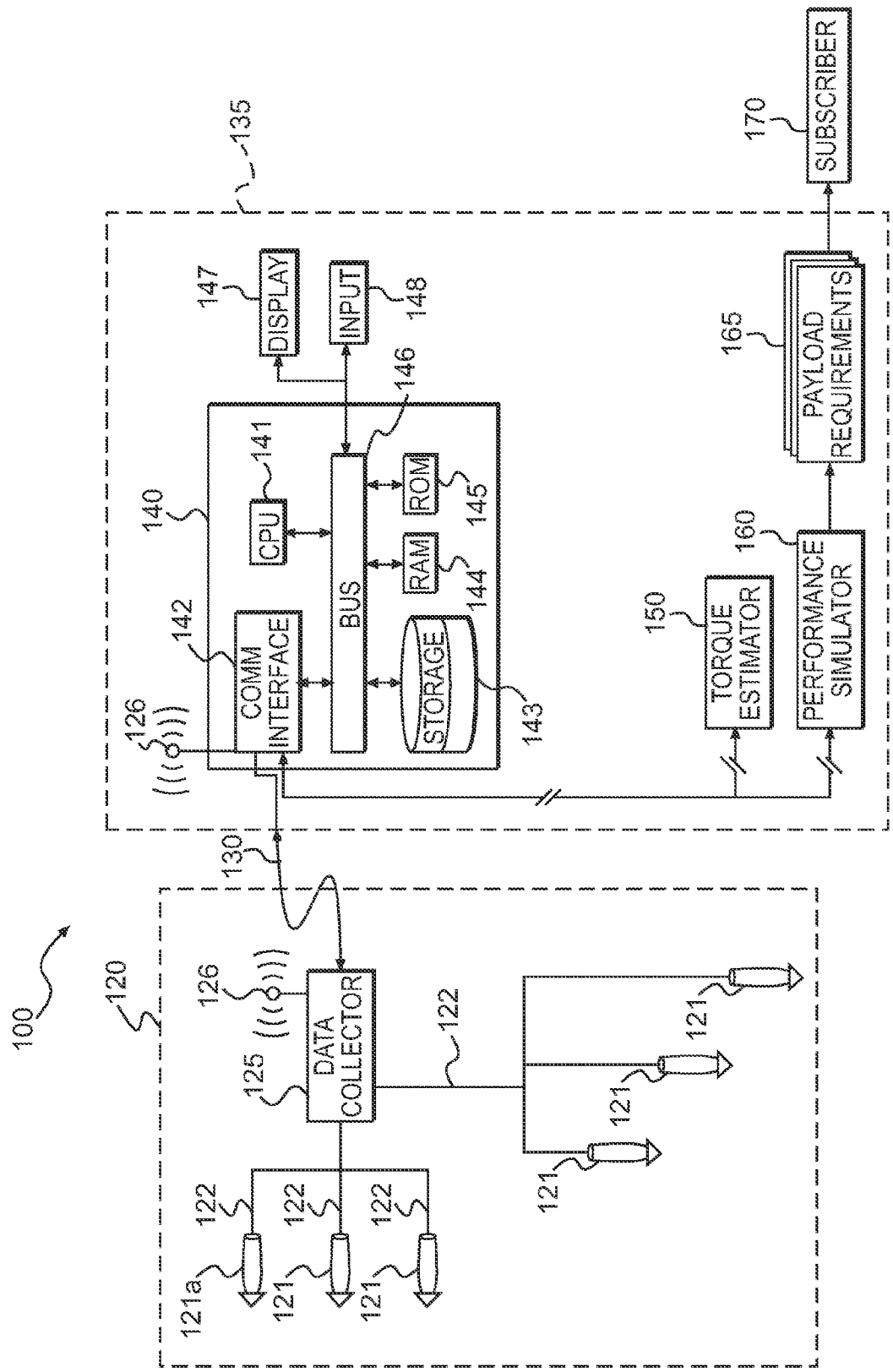
FIG. 2 provides a schematic diagram illustrating certain components associated with the work environment of FIG. 1.

In one embodiment, each of machines 120a, 120b may include on-board data collection and communication equipment to monitor, collect, and/or distribute information associated with one or more components of machines 120a, 120b. As shown in FIG. 2, machines 120a, 120b may each include, among other things, one or more monitoring devices 121, such as sensors, electronic control modules, etc. (not shown) coupled to one or more data collectors 125 via communication lines 122; one or more transceiver devices 126; and/or any other components for monitoring, collecting, and communicating information associated with the operation of machines 120a, 120b. Each of machines 120a, 120b may also be configured to receive information, warning signals, operator instructions, or other messages or commands from off-board systems, such as a haul route management system 135. The components described above are exemplary and not intended to be limiting. Accordingly, the disclosed embodiments contemplate each of machines 120a, 120b including additional and/or different components than those listed above.

Monitoring devices 121 may include any device for collecting performance data associated with one or more machines 120a, 120b. For example, monitoring devices 121 may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; grade; traction data; drive axle torque; intervals between scheduled or performed maintenance and/or repair operations; and any other operational parameter of machines 120a, 120b. In one embodiment, transport machines 120b may each include at least one torque sensor 121a for monitoring a torque applied to the drive axle. Alternatively, torque sensor 121a may be configured to monitor a parameter from which torque on the drive axle may be calculated or derived. It is contemplated that one or more monitoring devices 121 may be configured to monitor certain environmental features associated with work environment 100. For example, one or more machines 120a, 120b may include an inclinometer for measuring an actual grade associated with a surface upon which the machine is traveling.

Data collector 125 may be configured to receive, collect, package, and/or distribute performance data collected by monitoring devices 121. Performance data, as the term is used herein, refers to any type of data indicative of at least one operational aspect associated with one or more machines 120 or any of its constituent components or subsystems. Non-limiting examples of performance data may include, for example, health information such as fuel level, oil pressure, engine temperature, coolant flow rate, coolant temperature, tire pressure, or any other data indicative of the health of one or more components or subsystems of machines 120a, 120b. Alternatively and/or additionally, performance data may include status information such as engine power status (e.g., engine running, idle, off), engine hours, engine speed, machine speed, machine location and speed, current gear that the machine is operating in, or any other data indicative of a status of machine 120. Optionally, performance data may also include certain productivity information such as task progress information, load vs. capacity ratio, shift duration, haul statistics (weight, payload, etc.), fuel efficiency, or any other data indicative of a productivity of machine 120. Alternatively and/or additionally, performance data may include control signals for controlling one or more aspects or components of machines 120a, 120b. Data collector 125 may receive performance data from one or more monitoring devices via communication lines 122 during operations of the machine. According to one embodiment, data collector 125 may automatically transmit the received data to haul route management system 135 via communication network 130. Alternatively or additionally, data collector 125 may store the received data in memory for a predetermined time period, for later transmission to haul route management system 135. For example, if a communication channel between the machine and haul route management system 135 becomes temporarily unavailable, the performance data may be retrieved for subsequent transmission when the communication channel has been restored.

Communication network 130 may include any network that provides two-way communication between machines 120a, 120b and an off-board system, such as haul route management system 135. For example, communication network 130 may communicatively couple machines 120a, 120b to haul route management system 135 across a wireless networking platform such as, for example, a satellite communication system. Alternatively and/or additionally, communication network 130 may include one or more broadband communication platforms appropriate for communicatively coupling one or more machines 120a, 120b to haul route management system 135 such as, for example, cellular, Bluetooth, microwave, point-to-point wireless, point-to-multipoint wireless, multipoint-to-multipoint wireless, or any other appropriate communication platform for networking a number of components. Although communication network 130 is illustrated as a satellite wireless communication network, it is contemplated that communication network 130 may include wireline networks such as, for example, Ethernet, fiber optic, waveguide, or any other type of wired communication network.

Haul route management system 135 may include one or more hardware components and/or software applications that cooperate to improve performance of a haul route by monitoring, analyzing, optimizing, and/or controlling performance or operation of one or more individual machines. Haul route management system 135 may include a condition monitoring system 140 for collecting, distributing, analyzing, and/or otherwise managing performance data collected from machines 120a, 120b. Haul route management system 135 may also include a torque estimator 150 for determining a drive axle torque, estimating a total effective grade, calculating a rolling resistance, and/or determining other appropriate characteristics that may be indicative of the performance of a machine or machine drive train. Haul route management system 135 may also include a performance simulator 160 for simulating performance models of slow machines and optimizing payload of slow machines in order to maintain a desired speed of the haul route.

Condition monitoring system 140 may include any computing system configured to receive, analyze, transmit, and/or distribute performance data associated with machines 120a, 120b. Condition monitoring system 140 may be communicatively coupled to one or more machines 120 via communication network 130. Condition monitoring system 140 may embody a centralized server and/or database adapted to collect and disseminate performance data associated with each of machines 120a, 120b. Once collected, condition monitoring system 140 may categorize and/or filter the performance data according to data type, priority, etc. In the case of critical or high-priority data, condition monitoring system 140 may be configured to transmit "emergency" or "critical" messages to one or more work site personnel (e.g., repair technician, project managers, etc.) indicating that a remote asset has experienced a critical event. For example, should a machine become disabled, enter an unauthorized work area, or experience a critical engine operation condition, condition monitoring system 140 may transmit a message (text message, email, page, etc.) to a project manager, job-site foreman, shift manager, machine operator, and/or repair technician, indicating a potential problem with the machine.

Condition monitoring system 140 may include hardware and/or software components that perform processes consistent with certain disclosed embodiments. For example, as illustrated in FIG. 2, condition monitoring system 140 may include one or more transceiver devices 126, a central processing unit (CPU) 141, a communication interface 142, one or more computer-readable memory devices, including storage device 143, a random access memory (RAM) module 144, and a read-only memory (ROM) module 145, a display unit 147, and/or an input device 148. The components described above are exemplary and not intended to be limiting. Furthermore, it is contemplated that condition monitoring system 140 may include alternative and/or additional components than those listed above.

CPU 141 may be one or more processors that execute instructions and process data to perform one or more processes consistent with certain disclosed embodiments. For instance, CPU 141 may execute software that enables condition monitoring system 140 to request and/or receive performance data from data collector 125 of machines 120a, 120b. CPU 141 may also execute software that stores collected performance data in storage device 143. In addition, CPU 141 may execute software that enables condition monitoring system 140 to analyze performance data collected from one or more machines 120a, 120b, modify one or more production aspects of the machine (e.g., production schedule, product release date, production budget, etc.), improve a component parameter based on one or more predefined specifications associated with the component, and/or provide customized operation analysis reports, including recommendations for component optimization and/or design.

CPU 141 may be connected to a common information bus 146 that may be configured to provide a communication medium between one or more components associated with condition monitoring system 140. For example, common information bus 146 may include one or more components for communicating information to a plurality of devices. CPU 141 may execute sequences of computer program instructions stored in computer-readable medium devices such as, for example, a storage device 143, RAM 144, and/or ROM 145 to perform methods consistent with certain disclosed embodiments, as will be described below.

Communication interface 142 may include one or more elements configured for two-way data communication between condition monitoring system 140 and remote systems (e.g., machines 120a, 120b) via transceiver device 126. For example, communication interface 142 may include one or more modulators, demodulators, multiplexers, demultiplexers, network communication devices, wireless devices, antennas, modems, or any other devices configured to support a two-way communication interface between condition monitoring system 140 and remote systems or components.

One or more computer-readable medium devices may include storage devices 143, a RAM 144, ROM 145, and/or any other magnetic, electronic, flash, or optical data computer-readable medium devices configured to store information, instructions, and/or program code used by CPU 141 of condition monitoring system 140. Storage devices 143 may include magnetic hard-drives, optical disc drives, floppy drives, flash drives, or any other such information storing device. A random access memory (RAM) device 144 may include any dynamic storage device for storing information and instructions by CPU 141. RAM 144 also may be used for storing temporary variables or other intermediate information during execution of instructions to be executed by CPU 141. During operation, some or all portions of an operating system (not shown) may be loaded into RAM 144. In addition, a read only memory (ROM) device 145 may include any static storage device for storing information and instructions by CPU 141.

Condition monitoring system 140 may be configured to analyze performance data associated with each of machines 120a, 120b. According to one embodiment, condition monitoring system 140 may include diagnostic software for analyzing performance data associated with one or more machines 120a, 120b based on threshold levels (which may be factory set, manufacturer recommended, and/or user configured) associated with a respective machine. For example, diagnostic software associated with condition monitoring system 140 may compare an engine temperature measurement received from a particular machine with a predetermined threshold engine temperature. If the measured engine temperature exceeds the threshold temperature, condition monitoring system 140 may generate an alarm and notify one or more of the machine operator, job-site manager, repair technician, dispatcher, or any other appropriate entity.

In accordance with another embodiment, condition monitoring system 140 may be configured to monitor and analyze productivity associated with one or more of machines 120a, 120b. For example, condition monitoring system 140 may include productivity software for analyzing performance data associated with one or more machines 120a, 120b based on user-defined productivity thresholds associated with a respective machine. Productivity software may be configured to monitor the productivity level associated with each of machines 120a, 120b and generate a productivity report for a project manager, a machine operator, a repair technician, or any other entity that may subscribe to operator or machine productivity data (e.g., a human resources department, an operator training and certification division, etc.) According to one exemplary embodiment, productivity software may compare a productivity level associated with a machine (e.g., amount of material moved by a particular machine) with a predetermined productivity quota established for the respective machine. If the productivity level is less than the predetermined quota, a productivity notification may be generated and provided to the machine operator and/or project manager, indicating the productivity drop of the machine.

Condition monitoring system 140 may be in data communication with one or more other back-end systems and may be configured to distribute certain performance data to these systems for further analysis. For example, condition monitoring system 140 may be communicatively coupled to a torque estimator 150 and may be configured to provide performance data associated with the machine drive axle to torque estimator 150. Alternatively or additionally, condition monitoring system 140 may be in data communication with a performance simulator 160 and may be configured to provide performance data to performance simulator 160 for further analysis. Although torque estimator 150 and performance simulator 160 are illustrated as standalone systems that are external to condition monitoring system 140, it is contemplated that one or both of torque estimator 150 and performance simulator 160 may be included as a subsystem of condition monitoring system 140.

Torque estimator 150 may include a hardware or software module configured to receive/collect certain performance data from condition monitoring system 140 and determine, based on the received operation data, a drive axle torque associated with one or more machines 120a, 120b. Torque estimator 150 may be configured to determine a drive axle torque based on performance data collected by torque sensor 121a. Alternatively or additionally, drive axle torque may be estimated based on the performance data and the known design parameters of the machine. For example, based on an engine operating speed and the operating gear, torque estimator 150 may access an electronic look-up table and estimate the drive axle torque of the machine at a particular payload weight using the look-up table.

Once an estimated machine drive axle torque is determined, torque estimator 150 may estimate a total effective grade for the one or more machines. For example, torque estimator 150 may estimate a total effective grade (TEG) value as:

$$TEG = \frac{RP}{GMW} - \frac{MA}{AG}$$

where RP refers to machine rimpull, GMW refers to gross machine weight, MA refers to the acceleration of the machine, and AG refers to the actual grade of the terrain on which that machine is located. Gross machine weight and machine acceleration may be monitored using on-board data monitoring devices 121. Actual grade may be estimated based on monitored performance data. For example, actual grade may be determined using precision GPS data gathered from on-board GPS equipment. For example, performance data may include provide latitude, longitude, and elevation of the machine. The actual grade may be determined by calculating ratio between the vertical change in position (based on the elevation data associated with the GPS data) and the horizontal change in position (based on the latitude and longitude data associated with the GPS data). Alternatively or additionally, actual grade may be calculated using an on-board data monitoring device such as, for example, an inclinometer. Rim pull may be determined as:

$$RP = \frac{DAT \times LPTR \times PTE}{TDRR}$$

where DAT refers to the torque applied to the machine drive axle, LPTR refers to the lower power train reduction factor, PTE refers to the efficiency of the power train, and TDRR refers to the dynamic rolling radius of the tire. Lower power train reduction may be determined by monitoring a change in gear during real-time calculation of rim pull. Power train efficiency may be calculated based on real-time performance data collected from the machine. Tire dynamic rolling radius may be estimated based on a monitored tire pressure, speed, and gross machine weight.

Once total effective grade has been determined, torque estimator 150 may determine a rolling resistance associated with one or more of machines 120a, 120b. A rolling resistance value may be calculated as:

$$RR = TEG - (AG + EL)$$

where EL refers to the efficiency loss of the machine. Efficiency loss may be estimated as the difference between input power efficiency and output power efficiency, which may be estimated based on empirical test data at particular engine operating speeds and loading conditions. As explained, actual grade may be determined based on calculations associated with collected GPA data and/or monitored using an on-board inclinometer.

Performance simulator 160 may be configured to simulate performance of machines 120a, 120b under various operational or environmental conditions. Based on the simulation results, performance simulator 160 may determine ideal or optimal operating conditions to achieve a desired performance of machines 120a, 120b and/or work environment 100. According to one embodiment, performance simulator 160 may be any type of computing system that includes component or machine simulating software. The simulating software may be configured to build an analytical model corresponding to a machine or any of its constituent components based on empirical data collected from real-time operations of the machine. Once the model is built, performance simulator 160 may analyze the model under specific operating conditions (e.g., load conditions, environmental conditions, terrain conditions, etc.) and generate simulated performance data of the machine based on the specified conditions.

According to one embodiment, performance simulator 160 may include ideal design models associated with each of machines 120a, 120b. These ideal models can be electronically simulated to generate ideal performance data (i.e., data based on ideal performance of machine and its constituent components). Those skilled in the art will recognize that, as a machine ages, components associated with the machine may begin to exhibit non-ideal behavior, due to normal wear, stress, and/or damage to the machine during operation. In order to provide more realistic performance simulations consistent with these non-idealities, the ideal models may be edited based on actual performance data collected from machines 120a, 120b, thereby creating actual or empirical models of a respective machine and/or its individual components.

Performance simulator 160 may simulate the actual models to predict performance and productivity of the machine under a variety of operating conditions. For example, performance simulator 160 may simulate an actual model of hauler 120b under a multiple payload and/or haul route conditions to determine a speed, torque output, engine condition, fuel consumption rate, haul route completion time, etc. associated with each simulated condition. In one embodiment, performance simulator 160 may be configured to select a payload level for the machine to meet a desired operating condition of the haul route or work environment 100. For example, a user of performance simulator 160 may specify a desired speed of the machine required to maintain a productivity requirement of the haul route. Performance simulator 160 may simulate operation of the machine at multiple payload levels and estimate the desired speed of the machine at each payload level. Performance simulator 160 may select the payload level that allows the machine to meet the user-specified speed requirements.

In another example, a user of performance simulator 160 may specify a fuel consumption limit for the machine. Performance simulator 160 may simulate an operation of the machine under multiple load conditions and identify one or more payload levels that, if selected, allow the machine to operate within the fuel consumption limitations specified by the user.

Performance simulator 160 may also include a diagnostic and/or prognostic simulation tool that simulates actual machine models (i.e., models derived or created from actual machine data) to predict a component failure and/or estimate the remaining lifespan of a particular component or subsystem of the machine. For example, based on performance data associated with the engine and/or transmission, performance simulator 160 may predict the remaining lifespan of the engine, drive train, differential, or other components or subsystems of the machine. Accordingly, performance simulator 160 may predict how changes in a payload profile for a machine may affect the lifespan of one or more of these components. For instance, performance simulator 160 may estimate that, if payload for a particular hauler 120b is reduced by 10%, the remaining lifespan of the drive train may increase by 15%. Performance simulator 160 may periodically report this data to a mine operator, project manager, machine operator, and/or maintenance department of work environment 100.

It is contemplated that one or more of condition monitoring system 140, torque estimator 150, and/or performance simulator 160 may be included as a single, integrated software package or hardware system. Alternatively or additionally, these systems may embody separate standalone modules configured to interact or cooperate to facilitate operation of one or more of the other systems. For example, while torque estimator 150 is illustrated and described as a standalone system, separate from performance simulator 160, it is contemplated that torque estimator 150 may be included as a software module configured to operate on the same computer system as performance simulator 160.

Performance simulator 160 may be configured to generate payload requirements 165 for one or more vehicles operating in work environment 100. According to one embodiment, payload requirements 165 may include loading limits for one or more machines 120a, 120b that increase or enhance performance of the one or more machines 120a, 120b and/or work environment 100. For example, performance simulator 160 may identify an underperforming or slow machine and determine, based on the performance data associated with the machine, an optimal payload limit for the machine that enables the machine to maintain a desired speed. Performance simulator 160 may generate payload requirements 165 for the machine that specify the payload limits of the machine required to maintain a desired machine speed.

Payload requirements 165 may include paper-based or electronic reports that list machines whose payload levels are modified or prescribed to be lower than a maximum payload level for the machine. Thus, payload requirements 165 may be associated with any machine that performance simulator 160 prescribes to be loaded at less than a maximum loading level associated with the machine. According to one embodiment, payload requirements 165 may be delivered electronically (using email, text message, facsimile, etc.) or via any other appropriate format.

Performance simulator 160 may provide payload requirements 165 to one or more designated subscribers 170 of payload requirement data. Subscribers 170 may include, for example, operators of one or more transport machines 120b listed in the payload requirements 165, operators of one or more machines (e.g., automatic loading machines (conveyor belts, buckets, etc.), excavators 120a, etc.) responsible for loading transport machines 120b, project managers, mine owners, repair technicians, shift managers, human resource personnel, or any other person or entity that may be designated to receive payload requirements 165.

Figure 3:
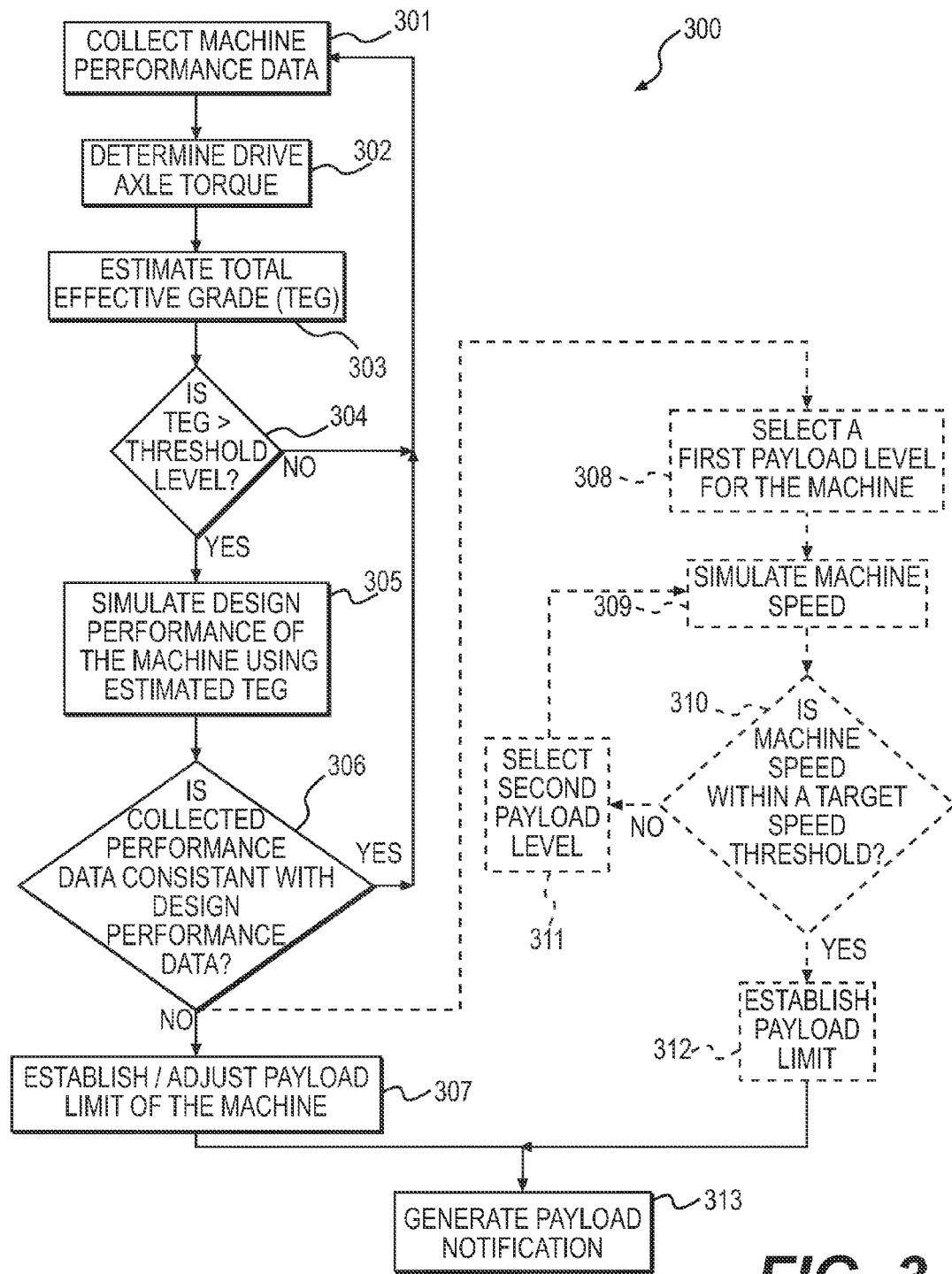
FIG. 3 provides a flowchart depicting one exemplary method for managing haul routes in work environments, consistent with certain disclosed embodiments.
Figure 4:
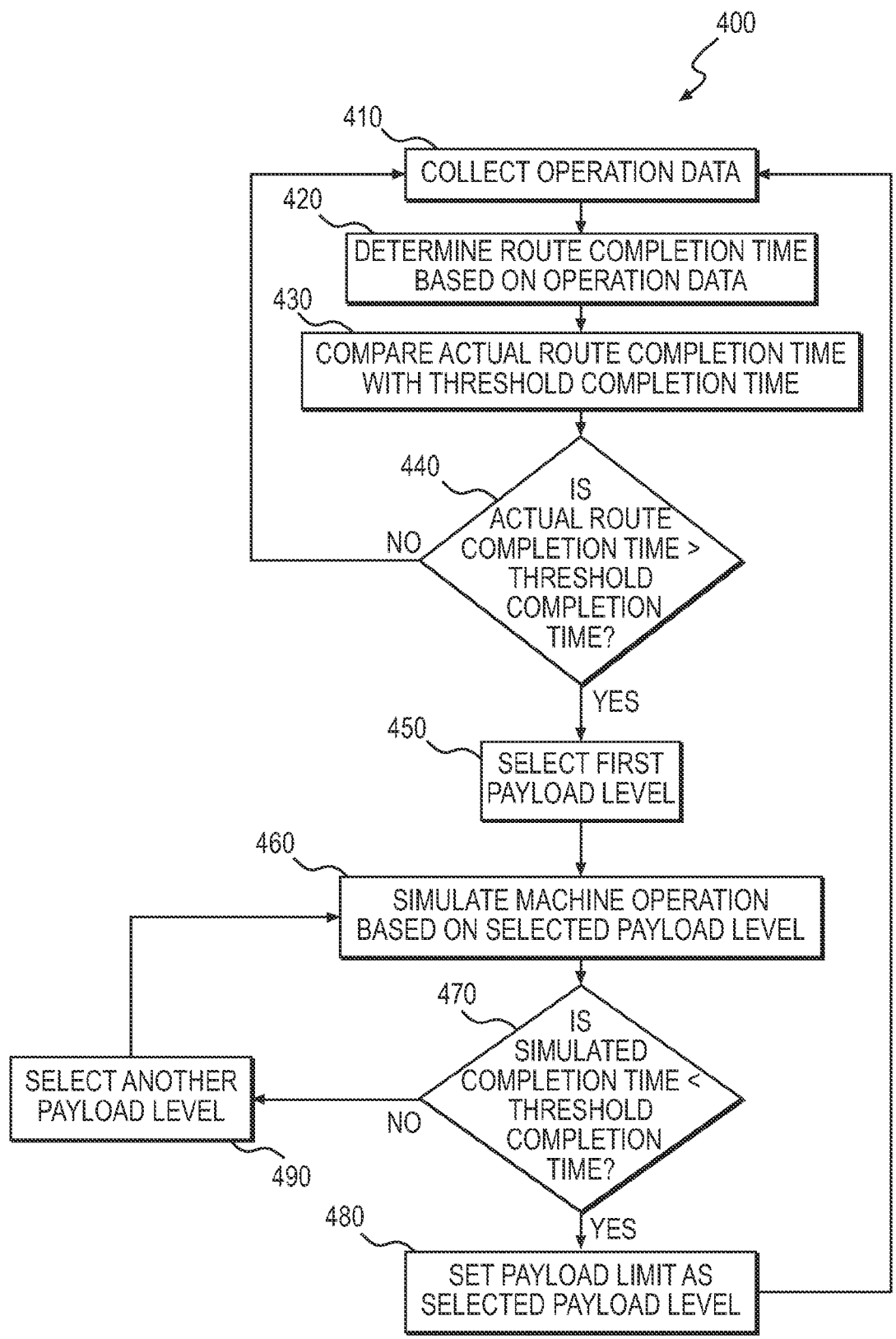
FIG. 4 provides a flowchart depicting another exemplary method for managing haul routes in work environments, consistent with certain disclosed embodiments.

Processes and methods consistent with the disclosed embodiments may enable optimization of a haul route based on real-time performance of one or more machines 120a, 120b operating in work environment 100 by providing a system that combines real-time data monitoring and collection capabilities with performance analysis and simulation tools. Specifically, the features and methods described herein allow project managers, equipment owners, and/or mine operators to effectively identify slow or underperforming machines, analyze performance data associated with these machines to establish or adjust payload limits that may enhance the speed and/or performance of the machines. Optionally, features and methods described herein may be configured to diagnose and/or correct any potential causes of deficient performance. FIGS. 3 and 4 provide flowcharts 300 and 400, respectively, which illustrate exemplary payload optimization methods associated with haul route management system 135.

As illustrated in FIG. 3, the payload optimization process may commence with the collection of machine performance data (Step 301). For example, condition monitoring system 140 of haul route management system 135 may receive/collect performance data from each machine operating in work environment 100. According to one embodiment, condition monitoring system 140 may automatically receive this data from data collectors 125 associated with each of machines 120a, 120b. Alternatively or additionally, condition monitoring system 140 may provide a data request to each of machines 120a, 120b and receive performance data from each machine in response to the request.

Once performance data has been received, a drive axle torque of the machine may be determined based on the performance data (Step 302). For example, torque estimator 150 may determine the drive axle torque based on data received from torque sensor 121a. Alternatively, torque estimator 150 may determine drive axle torque using electronic look-up tables (compiled from empirical test data associated with the type and model of machine) based on engine operating conditions, gear selection, and other data received from the machine.

As explained, once drive axle torque has been determined/estimated, torque estimator 150 may calculate/estimate a total effective grade associated with each machine (Step 303) and determine if the calculated/estimated total effective grade is greater than a threshold value (Step 304). The threshold value for total effective grade may be predetermined, user defined, or calculated based on operations of similar types of machines in work environment 100. For example, the threshold value for hauler 120b may be an average total effective grade associated with all similar makes and models of machines operating during haul route operations.

If the calculated total effective grade of the machine is less than or equal to the threshold value (Step 304: No) (which may indicate that the machine is operating normally), the process may proceed to Step 301 and continue data collection and monitoring activities for machine environment 100. If, on the other hand, the calculated total effective grade is greater than the threshold value (Step 304: Yes) (which may indicate that the machine is a slow or under-performing machine), the ideal (i.e., design) performance of the machine may be estimated using the calculated total effective grade (Step 305). Design performance may be estimated by simulating an ideal model of the machine. According to an exemplary embodiment, performance simulator 160 may simulate operation of the ideal model of the machine at the calculated total effective grade for the machine to obtain ideal performance data associated with the monitored total effective grade of the machine.

The design performance data collected from the simulated ideal machine model may be compared to the collected performance data (Step 306). For example, performance simulator 160 may compare ideal engine operating parameters generated by the simulated operation of machine at the actual total effective grade value with actual operating parameters collected from the machine. For a normal, healthy machine the actual engine operating parameters should be relatively consistent with the ideal engine operating parameters (less minor efficiency and performance losses associated with normal wear and tear). Thus, actual engine operating parameters that are inconsistent with the ideal engine operating parameters may be an indication that the machine is slow or underperforming.

In determining whether the actual engine operating parameters are consistent with the ideal engine operating parameters, performance simulator 160 may determine whether the actual parameters are within an acceptable range of the ideal parameters. These acceptable ranges may be predetermined and/or user-defined. Furthermore, the size of acceptable ranges may be dependent upon the parameter under investigation. For example, in work environments where operating speed of each machine is critical to the productivity of work environment 100 (e.g., work sites having only one haul route where bottlenecks may substantially affect haul route productivity), the acceptable range for speed may be more strict than an acceptable range for another parameter (e.g., fuel consumption). In contrast, for work environments where fuel consumption is important, the acceptable range for fuel economy may be more strict than that for speed.

If the actual performance data for the machine is consistent with the ideal performance data (Step 306: Yes), indicating that the machine is operating normally, performance simulator 160 may determine that the machine requires no operational adjustment or regulation. Accordingly, the process may continue to Step 301 and continue monitoring machine performance data associated with work environment 100.

In contrast, if the actual performance data for the machine is not consistent with the ideal performance data (Step 306: No), performance simulator 160 may establish/adjust a payload limit for the machine (Step 307). For example, if the actual performance data indicates that a particular machine is slower and/or less efficient than other machines operating in work environment 100, performance simulator 160 may determine a payload limit that eases the strain on the slower machine that enables the machine to keep pace with faster machines.

Performance simulator 160 may estimate the optimum payload limit by simulating performance of the machine under multiple payload conditions. For example, performance simulator 160 may select a first payload level for the machine, whereby the first payload level is less than the payload level present during the machine's underperforming operations (Step 308). Performance simulator 160 may simulate the machine speed at the first payload level (Step 309) and determine whether the speed is within a desired speed threshold (Step 310). If the simulated speed is within the desired speed threshold (Step 310: Yes), performance simulator 160 may establish the payload limit as the first payload level. If, on the other hand, the simulated speed is not within the desired speed threshold (Step 310: No), performance simulator 160 may select a second payload level (Step 311). Performance simulator 160 may repeat Steps 309 and 310 until a suitable payload level (i.e., one that causes the machine to conform to the desired speed threshold) has been identified.

Upon identification of a suitable payload level that conforms to the desired speed requirement of work environment 100, performance simulator 160 may generate a payload notification (Step 313). Payload notification may include an electronic message, which may be transmitted to a work environment manager, a haul machine operator, an excavator operator, a mine operator, or a machine dispatcher. By generating and distributing a payload notification, indicating recommended payload limits for slow or underperforming machines, haul route management system 135 may more quickly and efficiently resolve work environment performance inefficiencies by leveraging real-time data collection capabilities with performance simulation and modeling techniques.

It is contemplated that additional and/or different methods may be used to identify a slow or underperforming machine. For example, as an alternative or in addition to identifying a slow or underperforming machine based on total effective grade and machine speed data calculations, underperforming machines may be identified based by monitoring route completion time for one or more machines. FIG. 4 provides a flowchart 400 illustrating an exemplary method for managing a haul route based on route completion time.

As illustrated in FIG. 4, condition monitoring system 140 may receive/collect machine performance data associated with each machine operating in work environment 100 (Step 410). Based on the received performance data, condition monitoring system 140 may determine/estimate a route completion time associated with each machine (Step 420). For example, a haul route may be stored in memory associated with condition monitoring system 140. During operations of the machine, condition monitoring system 140 may monitor location of each machine using position sensors, GPS, or any other suitable device or system for monitoring a machine position. To determine a haul route completion time, condition monitoring system 140 may record times when each machine reaches designated starting and stopping points of the route. Condition monitoring system 140 may subsequently calculate an actual haul route completion time as the elapsed operating time between the route starting and stopping points.

Condition monitoring system 430 may compare the actual route completion time with a threshold completion time (Step 430) and determine whether the actual route completion time exceeds the threshold completion time (Step 440). According to one embodiment, threshold completion time may be determined based on machine test data by conducting several test haul route runs with a normal, healthy machine.

If the actual route completion time for a particular machine is less than or equal to the threshold completion time (Step 440: No) (indicating that the performance of the machine is normal), the process may proceed to Step 410 and continue monitoring the performance of machines 120a, 120b. If, however, the actual route completion time exceeds a threshold completion time (Step 440: Yes), performance simulator 160 may select a first payload level (Step 450) and simulate machine operation to estimate a simulated completion time for the machine based on the selected payload level (Step 460).

The simulated completion time may be compared with the threshold completion time to predict whether the selected payload level is sufficient to enable the machine to complete the haul route run within the threshold completion time (Step 470). If the simulated completion time is less than or equal to the threshold completion time, performance simulator 160 may establish a payload limit as the selected payload level for the machine (Step 480). Accordingly, a payload limit and/or the simulated test results may be provided to a project manager, a mine operator, a machine operation, a machine dispatcher, or any person or entity authorized to prescribe payload adjustments for one or more machines.

If, however, the simulated completion time exceeds the threshold completion time (Step 470: No), performance simulator 160 may select an alternative payload level (less than the first selected payload level) (Step 490). The process may then proceed to Step 460 to repeat the haul route simulation. The processes associated with modifying the payload limit and simulating the haul route run (Step 460, 470, and 490) may be repeated until a payload limit that enables the machine to conform to the threshold completion time has been identified.

It is contemplated that the methods associated with FIGS. 3 and 4 may also be used as diagnostic tools to determine whether a particular slow or underperforming machine requires maintenance. In one embodiment, performance simulator 160 may be configured to provide a performance alert if performance simulations reveal that, in order for a machine to meet the speed or time requirements associated with a haul route, the machine must be operated at or below a predetermined or user-defined minimum percentage of a rated payload capacity. Accordingly, if the performance of the machines degrades to such a point so as to cause the payload limit to fall below the minimum acceptable value, performance simulator 160 may provide a diagnostic warning to a work environment management, a mine operator, an operator of the machine, or a repair technician.

INDUSTRIAL APPLICABILITY

Methods and systems consistent with the disclosed embodiments may provide a haul route management solution that integrates real-time equipment monitoring systems and performance-based analysis and simulation tools to identify a target payload level for each machine improves performance and/or productivity of work environment 100. Work environments that employ processes and features described herein provide an automated system for detecting slow or unproductive machines and, using performance data collected from each machine during real-time operations of the machines, estimating an optimum payload level to achieve the desired performance level.

Although the disclosed embodiments are described in connection with work environments involving haul routes for mining equipment, they may be applicable to any work environment where it may be advantageous to identify underperforming machines that have a negative impact on the productivity of other machines or a fleet of machines. According to one embodiment, the presently disclosed haul route management system and associated methods may be implemented as part of a connected worksite environment that monitors performance data associated with a machine fleet and diagnoses potential problems with machines in the fleet. As such, the haul route management system may enable both health and productivity monitoring of a work environment using real-time performance data associated with the one or more machines.

The presently disclosed haul route management system and associated methods may have several advantages. For example, because the haul route management system is configured to identify slow or underperforming machines and determine ideal payload limits for these machines, mine operators or work environment managers may be able to efficiently modify operations of individual machines to conform to desired operations of the haul route, without jeopardizing productivity of other machines. In contrast with conventional systems that may reduce or limit the speed of faster machines to yield to slower machines, the presently disclosed system provides a solution to identify slow machines and take appropriate action to ensure that the slower machines keep pace with faster machines.

Furthermore, the presently disclosed haul management system 135 may have certain cost advantages over conventional systems. For example, because the haul management systems and associated methods described herein are configured to identify target payload levels of one or more machines based on desired performance characteristics of the machine and/or the haul route, mine operators or project managers may adjust the payload requirements of the fleet so as to minimize fuel consumption or prolong component lifespan. As a result, fuel costs and costs associated with premature component failure (e.g., repair costs, productivity costs associated with machine downtime, etc.) may be limited or reduced.

It will be apparent to those skilled in the art that various modifications and variations can be made to the disclosed performance-based haulage management system and associated methods without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A haul route management system, comprising:
   a condition monitoring system in data communication with a machine operating in a work environment and configured to collect performance data associated with the machine;
   a torque estimator communicatively coupled to the condition monitoring system and configured to determine a drive axle torque of the machine and estimate a total effective grade associated with the machine based on the drive axle torque;
   a performance simulator communicatively coupled to the torque estimator and the condition monitoring system, wherein the performance simulator is configured to:
   compare the estimated total effective grade with a threshold level;
   simulate, if the estimated total effective grade exceeds the threshold level, a design performance of the machine based on the estimated total effective grade;
   compare design performance data with the collected performance data;
   perform a payload analysis of the machine if the collected performance data is inconsistent with the design performance data; and
   establish a payload limit of the machine based on the payload analysis.

2. The system of claim 1, wherein the condition monitoring system is wirelessly coupled to an on-board data collector of the machine and configured to receive performance data from the on-board data collector during operations of the machine.

3. The system of claim 1, wherein the performance simulator is further configured to:
   analyze, if the estimated total effective grade exceeds the threshold level, the collected data to determine a potential cause of inconsistency between the collected performance data and the design performance data; and
   generate a report that summarizes the potential cause of the inconsistency and provides recommendations for resolving the potential cause of the inconsistency.

4. The system of claim 3, wherein the performance simulator is further configured to:
   estimate an actual remaining lifespan associated with one or more of the components of the machine based on a current payload level;
   generate a simulated remaining lifespan associated with one or more of the components of the machine based on the established payload limit; and
   wherein the report further summarizes a difference between the actual remaining lifespan and the simulated remaining lifespan.

5. The system of claim 1, wherein performing the payload analysis includes:
   selecting a first payload level for the machine;
   simulating a speed of the machine based on the first payload level;
   determining whether the simulated speed is within a target speed threshold; and
   selecting, if the simulated speed is not within a target speed threshold, a second payload level for the machine and simulating the speed of the machine based on the second payload level;
   wherein establishing the payload limit for the machine includes establishing, if the simulated speed is within a target speed threshold, the payload limit for the machine as the first payload level.

6. The system of claim 5, further including:
   generating a payload notification indicative of the payload limit for the machine; and
   providing the payload notification to a payload subscriber.

7. The system of claim 1, wherein the performance simulator includes the torque estimator.

8. The system of claim 1, wherein the performance data includes at least one of a position, a machine speed, a machine acceleration, an engine load factor, a machine payload, a fluid pressure or temperature, a tire pressure, and a gear position.

* * * * *